Patented Nov. 20, 1951

2,575,611

UNITED STATES PATENT OFFICE 2,575,611

IRON CHOLINE CITRATES AND METHOD OF PREPARING THE SAME

Fred J. Bandelin, Decatur, Ill., assignor to Flint Eaton and Company, Decatur, Ill.

No Drawing. Application July 22, 1949, Serial No. 106,320

2 Claims. (Cl. 260—439)

The instant invention relates to therapeutic agents and more particularly to iron and choline citrates comprising products formed by reacting choline dihydrogen citrate with appropriate iron salts, not necessarily, however, in molar proportions.

The citrates above identified have been found useful for administration to both human beings and animals in the treatment of certain types of anemia.

Choline salts are recognized as useful in the treatment and prevention of liver cirrhosis and certain other forms of liver damage. If the liver tissue is deteriorated by fat as is common in these conditions, its role in blood regeneration and in the storage of the anti-anemia principle is markedly impaired, thereby contributing to the anemia. These salts make possible the concomitant treatment of anemia and liver damage. The combination of iron and choline salts is also of value for the administration of iron in iron deficiency anemia or other conditions for which iron may be indicated even though liver damage is not apparent.

The new therapeutic agents are prepared by reacting choline dihydrogen citrate with appropriate iron salts. Each molecule of choline is combined with a molecule of citric acid to form a citrate salt, leaving two of the acid groups of the citrate unreacted. The following is illustrative.

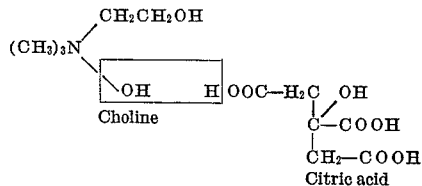

The compound formed as above, choline dihydrogen citrate, is the citrate salt of the organic base choline, and it will be seen that two of the acidic groups are available for subsequent chemical action.

These acidic groups of choline dihydrogen citrate are caused to react, wholly or in part, with appropriate iron compounds to form the combination heretofore mentioned. The resulting compounds are somewhat analogous to ferric ammonium citrates but have different and additional action. There is evidence to indicate they are possibly coordination products of ferricholine citrate and ferric hydroxide.

The therapeutic agents of the instant invention may be prepared by reaction of appropriate iron salts such as ferric hydroxide or ferrous carbanate with choline dihydrogen citrate. The agents as previously indicated are not limited to quantities theoretically necessary to form compounds of definite molecular composition but includes in its broader phases any product, either a compound or a mixture, in which the acidic groups of choline dihydrogen citrate are wholly or partially replaced with iron.

Example

The iron may exist in ratios up to 1 mol of iron to 1 mol of choline dihydrogen citrate.

The salts of the instant invention may be prepared as follows:

*Example 1.*—107 parts of freshly prepared ferric hydroxide are added to 295 parts of choline dihydrogen citrate dissolved in 200 parts of distilled water and heated to approximately 80° C. until a homogeneous solution occurs. The resulting reddish brown solution may be used as such or it may be dried by evaporating the water. The dried product is a reddish brown, amorphous solid presenting a glistening surface upon fracture. The dry product is somewhat hygroscopic and is freely soluble in water to give a stable solution.

*Example 2.*—53.5 of freshly prepared ferric hydroxide are added to 295 parts of choline dihydrogen citrate dissolved in 400 parts of distilled water and heated to 80° C. until a homogeneous green colored solution occurs. The solution so obtained may be used as such or it may be dried by evaporating the water. The resulting amorphous greenish brown to brownish green solid is somewhat hygroscopic and is freely soluble in water to give a stable solution.

*Example 3.*—116 parts of freshly prepared ferrous carbonate are added to 295 parts of choline dihydrogen citrate dissolved in 400 parts of distilled water. The reaction is characterized by vigorous effervescence and liberation of carbon dioxide. The solution is heated to 80° C. and stirred to remove the carbon dioxide and the resulting solution may be used as such or it may be dried by evaporation of the water. The resulting reddish brown solid is somewhat hygroscopic and freely soluble in water, yielding a stable solution.

*Example 4.*—58 parts of freshly prepared ferrous carbonate are added to 295 parts of choline dihydrogen citrate dissolved in 200 parts of distilled water. The reaction is characterized by vigorous effervescence with the liberation of carbon dioxide. The solution is heated to 80° C. and stirred to remove the carbon dioxide and the resulting solution may be used as such or it may be dried by evaporating the water. The resulting green morphous solid is somewhat hygroscopic and freely soluble in water to yield stable solutions.

It will be appreciated that various minor changes may be made in the detailed description immediately preceding and it is contemplated to cover all such and to be limited in this respect only as may be necessary by the scope of the claims hereto appended.

What I claim and desire to secure by Letters Patent is:

1. The compound prepared by the reaction of choline dihydrogen citrate with ferric hydroxide having the structure:

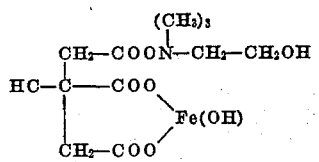

2. The method of preparing a pharmaceutical composition comprising adding a water solution of choline dihydrogen citrate to ferric hydroxide, the proportions of the former to the latter being substantially as 295 is to 107, heating the mixture so formed to 80° C. with stirring until the ferric hydroxide is reacted as evidenced by the formation of a homogeneous reddish brown solution.

FRED J. BANDELIN.

REFERENCES CITED

The following references are of record in the file of this patent:

UNITED STATES PATENTS

| Number | Name | Date |
|---|---|---|
| 2,081,547 | Matthews | May 25, 1937 |
| 2,239,543 | Andrews | Apr. 22, 1941 |
| 2,317,309 | Stenzl | Apr. 20, 1943 |
| 2,364,018 | Barnard | Nov. 28, 1944 |
| 2,481,412 | Grindrod | Sept. 6, 1949 |

FOREIGN PATENTS

| Number | Country | Date |
|---|---|---|
| 8,031 | Great Britain | of 1914 |

OTHER REFERENCES

Osol, The Dispensatory of U. S., 24th Ed., J. P. Lippincott Co., pp. 1400–1401, Phila., 1947.

Harris et al., Vitamins and Hormones, Academic Press, Inc., N. Y., p. 51.

Chemical Abstracts, vol. 43, Jan. 1949, p. 702f, citing Proc. Soc. Experimental Biol. Med. 68:466–471 (1948).